United States Patent
Lai et al.

(10) Patent No.: US 10,290,324 B2
(45) Date of Patent: May 14, 2019

(54) RECORDING DEVICE, RECORDING CONTROL METHOD AND NON-TRANSITORY COMPUTER READABLE MEDIUM THEREOF

(71) Applicant: HTC Corporation, Taoyuan (TW)

(72) Inventors: Jen-Cheng Lai, Taoyuan (TW); Jia-Yuan Hsu, Taoyuan (TW); Tzu-Chia Tan, Taoyuan (TW); Chih-Yao Kuo, Taoyuan (TW); Chun-Hao Lin, Taoyuan (TW); Szu-Han Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/828,501

(22) Filed: Aug. 17, 2015

(65) Prior Publication Data

US 2016/0249011 A1 Aug. 25, 2016

Related U.S. Application Data

(60) Provisional application No. 62/120,849, filed on Feb. 25, 2015.

(51) Int. Cl.
*H04N 7/01* (2006.01)
*G11B 27/10* (2006.01)
*H04N 5/765* (2006.01)
*H04N 5/77* (2006.01)
*H04N 5/232* (2006.01)

(52) U.S. Cl.
CPC ............. *G11B 27/10* (2013.01); *H04N 5/232* (2013.01); *H04N 5/765* (2013.01); *H04N 5/77* (2013.01)

(58) Field of Classification Search
CPC ....... H04N 7/0127; H04N 5/765; G11B 27/10

USPC .......................................................... 386/200
See application file for complete search history.

(56) References Cited

U.S. PATENT DOCUMENTS

| 2003/0081128 A1* | 5/2003 | Kirmuss | B60R 11/02 348/207.99 |
| 2004/0080717 A1* | 4/2004 | Pate | H05B 37/03 353/52 |
| 2004/0141442 A1* | 7/2004 | Suzuki | G11B 7/1263 369/47.53 |

(Continued)

FOREIGN PATENT DOCUMENTS

| CN | 102291534 A | 12/2011 |
| CN | 102301711 A | 12/2011 |
| TW | 201234843 A | 8/2012 |

OTHER PUBLICATIONS

Corresponding Taiwanese Office Action that these art references were cited on May 26, 2016.

*Primary Examiner* — Thai Q Tran
*Assistant Examiner* — Nien Yang
(74) *Attorney, Agent, or Firm* — CKC & Partners Co., LLC

(57) ABSTRACT

A recording device includes a camera component, a temperature sensor, and a processing component. The camera component is configured to capture a video to generate video data. The temperature sensor is configured to detect an operating temperature of the recording device. The processing component is configured to process the video data, and to enable the camera component to dynamically adjust at least one of a data rate of the video data and a frame rate of the video data according to the operating temperature during the camera component captures the video.

16 Claims, 3 Drawing Sheets

(56) References Cited

U.S. PATENT DOCUMENTS

| | | | |
|---|---|---|---|
| 2011/0026387 A1* | 2/2011 | Sagarai | G11B 7/1263 369/47.53 |
| 2012/0189264 A1* | 7/2012 | Okazaki | H04N 5/772 386/227 |
| 2014/0267799 A1 | 9/2014 | Sadasivam et al. | |
| 2014/0380029 A1* | 12/2014 | Tokuda | H04M 1/72569 713/1 |

* cited by examiner

RECORDING DEVICE, RECORDING CONTROL METHOD AND NON-TRANSITORY COMPUTER READABLE MEDIUM THEREOF

RELATED APPLICATIONS

This application claims priority to U.S. Provisional Application Ser. No. 62/120,849, filed Feb. 25, 2015, which is herein incorporated by reference.

BACKGROUND

Technical Field

The present disclosure relates to a recording device. More particularly, the present disclosure relates to a recording device having a recording control method that is able to extend a recording time.

Description of Related Art

High quality video recordation has been widely applied to various electronic products. However, when recording the high quality video, an operating temperature and a power consumption of the electronic product are significantly increased. If the recording time of the video is too long, the electronic product may be suffered from a thermal damage.

In some approaches, a fixed time limitation for the recording time is employed, so as to interrupt the recordation when the time limit is over. In some other approaches, a temperature margin is employed, so as to interrupt recordation when the operating temperature reaches the temperature margin. Accordingly, in those approaches, the video length of the video is limited.

SUMMARY

An aspect of the present disclosure is to provide a recording device The recording device includes a camera component, a temperature sensor, and a processing component. The camera component is configured to capture a video to generate video data. The temperature sensor is configured to detect an operating temperature of the recording device. The processing component is configured to process the video data, and to enable the camera component to dynamically adjust at least one of a data rate of the video data and a frame rate of the video data according to the operating temperature during the camera component captures the video.

Another aspect of the present disclosure is to provide a recording control method. The recording control method includes the following operations: capturing a video, by an camera component of an electronic device, to generate a video data; detecting an operating temperature of the electronic device by a temperature sensor of the electronic device; and enabling the camera component to dynamically adjust at least one of a data rate of the video data and a frame rate of the video data, by a processing component of the electronic device, according to the operating temperature during the camera component captures the video.

Yet another aspect of the present disclosure is to provide a non-transitory computer readable medium. The non-transitory computer readable medium has computer program which, when executed by a processing component of an electronic device, result in the processing component performing operations including: enabling a camera component to capture a video, so as to generate a video data; enabling a temperature sensor to detect an operating temperature of the electronic device; and enabling the camera component to dynamically adjust at least one of a data rate of the video data and a frame rate of the video data according to the operating temperature during the camera component captures the video.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
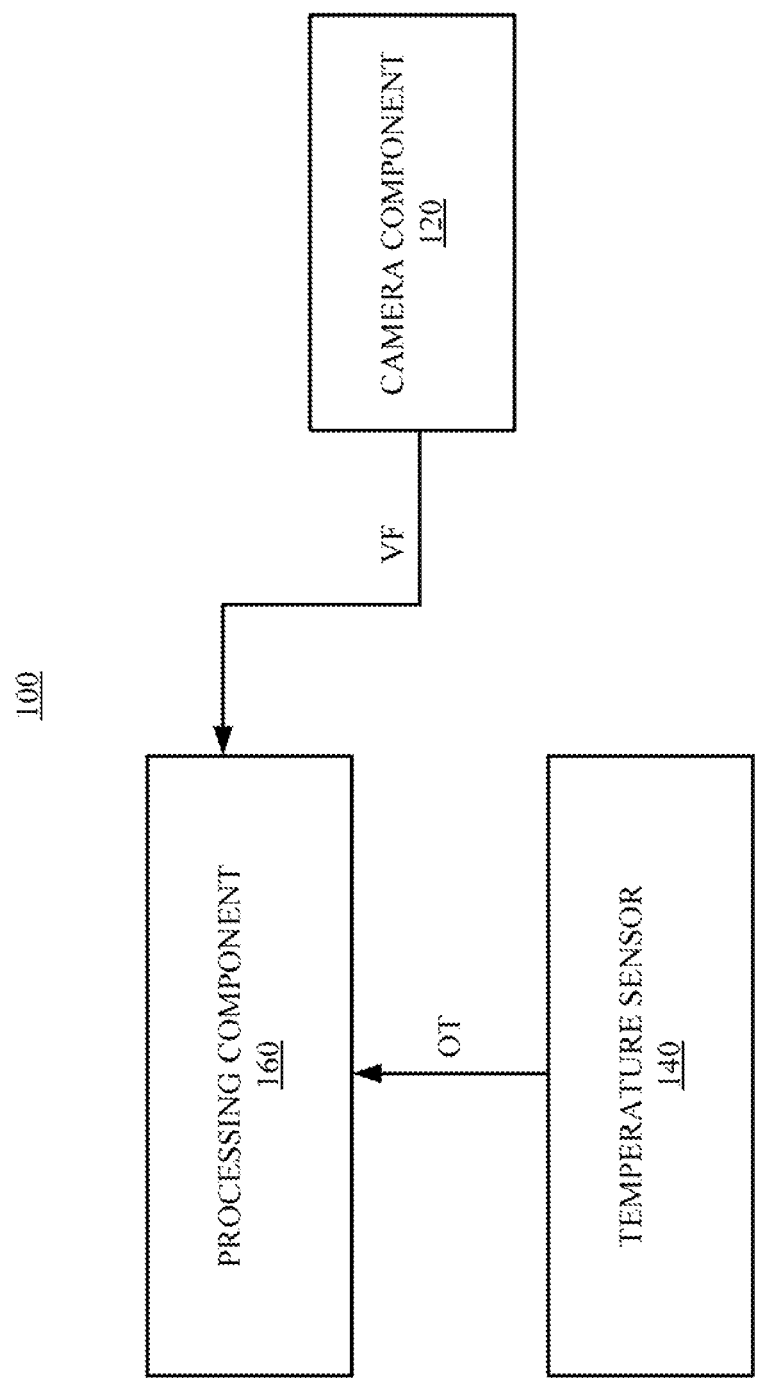
FIG. 1 is a schematic diagram of a recording device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

In this document, the term "coupled" may also be termed as "electrically coupled," and the term "connected" may be termed as "electrically connected." "Coupled" and "connected" may also be used to indicate that two or more elements cooperate or interact with each other.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

FIG. 1 is a schematic diagram of a recording device according to some embodiments of the present disclosure. In various embodiments, the recording device 100 is able to be applied to or to be integrated with various electronic products, such as digital cameras, digital video recorders, tablet PC, mobile phones, etc.

As shown in FIG. 1, the recording device 100 includes a camera component 120, a temperature sensor 140, and a processing component 160. The camera component 120 is coupled to the processing component 160, some embodiments, the camera component 120 includes a lens and an image senor. The lens is able to record the video or to form an image by focusing light from the image view onto the image sensor. The image sensor is able to accordingly convert the image to electronic signals (i.e. the video data VF). In other words, the camera component 120 can be configured to capture a video to generate video data VF, and/or to shoot images. In some embodiments, the camera component 120 can record the video with high quality. For example, the resolution of the video recorded by the camera component 120 can be Super Hi-Vision (i.e., 8K2K resolution), Ultra HD (i.e., 4K2K resolution), Full HD, HD, etc. In some embodiments, the resolution of the video recorded by the camera component 120 can be adjusted by a user during capturing the video. The resolution of the video is given for illustrative purposes only. Various resolutions of the video are within the contemplated scope of the present disclosure.

The temperature sensor 140 is configured to detect an operating temperature OT of the recording device 100. For example, the temperature sensor 140 is a thermal sensor that is able to detect thermal energy induced by internal circuits of recording device 100.

The processing component 160 is configured to control the camera component 120 to capture the video, and to process the video data VF transmitted from the camera component 120. The processing component 160 is coupled to the temperature sensor 140, so as to receive the operating temperature OT sensed by the temperature sensor 140. In some embodiments, the processing component 160 is implemented with micro-processors, controllers, etc.

In various embodiments, the processing component 160 is configured to enable the camera component 120 to dynamically adjust at least one of a data rate of the video data VF and a frame rate, frame per second (FPS), of the video data VF according to the operating temperature OT sensed by the temperature sensor 140 during the camera component 120 captures the video. Through such arrangements, the recording time for each videos recorded by the recording device 100 can be extended.

The following paragraphs describe certain embodiments related to the recording device 100 to illustrate functions and applications thereof. However, the present disclosure is not limited to the following embodiments.

Figure 2:
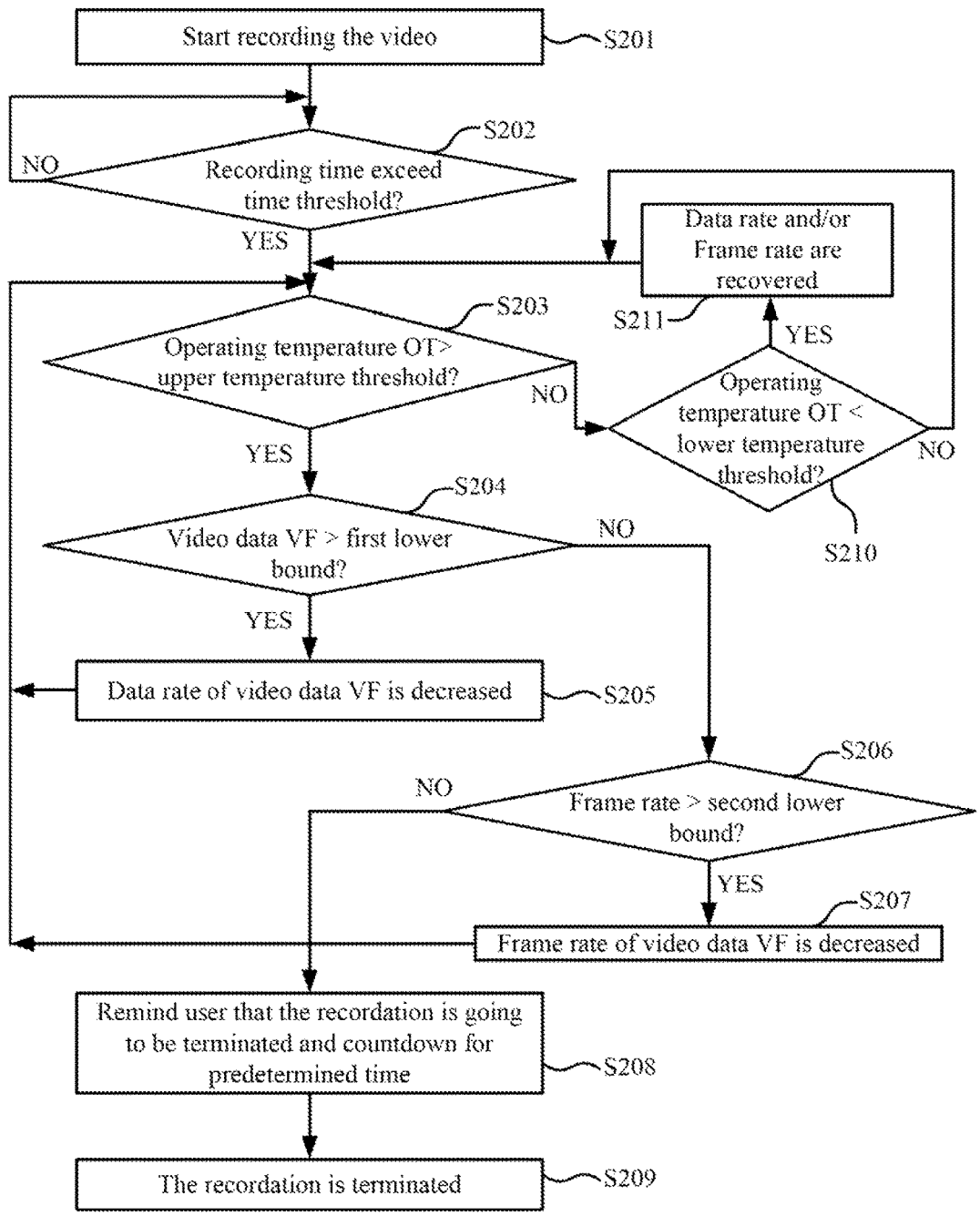
FIG. 2 is a flow chart of a recording control method according to some embodiments of the present disclosure.

Reference is now made to FIG. 2. FIG. 2 is a flow chart of a recording control method according to some embodiments of the present disclosure. As an example, the recording device 100 of FIG. 1 is described as implementing the recording control method 200. As shown in FIG. 2, the recording control method 200 includes steps S201-S211.

In step S201, the camera component 120 is enabled by the processing component 160, so as to start recording the video.

In step S202, the processing component 160 determines whether a recording time of the video exceeds a time threshold. If so, step S203 is performed. Otherwise, step S202 is repeatedly performed. For example, in some embodiments, the time threshold is set to about 3 minutes. By setting the time threshold, a basic amount of the video length of the video recorded by the recording device 100 can be set.

The value of the time threshold is given for illustrative purposes only. Various values of the time threshold are within the contemplated scope of the present disclosure.

With continued reference to FIG. 2, in step S203, the processing component 160 determines whether the operating temperature OT sensed by the temperature sensor 140 is higher than an upper temperature threshold for every predetermined period. If so, step S204 is performed. Otherwise, step S210 is performed.

For example, in some embodiments, the operating temperature OT is about 40° C., and the predetermined period is about 10 seconds. Accordingly, the processing component 160 determines whether the operating temperature OT is higher than 40° C. at 3 minutes (i.e., the time threshold in step S202), 3 minutes and 10 seconds, 3 minutes and 20 seconds, and so on, of the recording time. In other words, in this example, the timing for performing step S203 can be described as follows: 3 minutes+(n+1)*10 seconds, where n is an integer being greater than and equal to 0. In some other embodiments, the step S203 is performed aperiodically.

With continued reference to FIG. 2, in step S204, the processing component 160 determines whether the data rate of the video data VF is higher than a first lower bound. If so, step S205 is performed. Otherwise, step S206 is performed.

In step S205, the camera component 120 is enabled by the processing component 160 to decrease the data rate of the video data VF by a predetermined amount. After step S205 is performed, the processing component 160 returns to step S203. In some embodiment, the data rate of the video data VF is referred to as a transmission bandwidth for the video data from the camera component 120 to the processing component 160. For example, in some embodiments, the resolution of the video is 3840*2160, and the original data rate of the video data VF outputted from the camera component 120 to the processing component 160 is about 16 megabyte per second (MB/s), or about 16 megabit per second (Mb/s). The first lower bound is set to about 8.5 MB/s or 8.5 Mb/s to keep the video quality. When the operating temperature OT is higher than the upper temperature bound and the original data rate of the video data VF is higher than the first lower bound, the camera component 120 decreases the data rate by the predetermined amount, e.g., 0.5 MB/s, or 0.5 Mb/s. In other words, under this circumstance, the original data rate of the video data VF is decreased from 16 MB/s or 16 Mb/s to 15.5 MB/s or 15.5 Mb/s. Since the data rate of the video data VF is reduced, the camera component 120 is able to transmit the video data VF with a slower operating speed. Accordingly, the processing component 160 can process the video data VF having smaller data size, the thermal energy generated from the camera component 120 and the processing component 160 is reduced, and the thus operating temperature OT is decreased. As a result, the operations of the camera component 120 will not be interrupted, and the recording time of the video is thus extended.

In some embodiments, the camera component 120 decreases the data rate of the video data VF by employing a video compression algorithm to compress the video data VF. In some other embodiments, the data rate of the video data VF is compressed by a predetermined compression ratio. In yet some embodiments, the camera component 120 decreases the data rate of the video data VF by refraining certain information being transformed to the processing component 160.

The original data rate and the first lower bound correspond to the resolution of the video. The higher resolution of the video and/or the more complex mode for capturing the video (e.g., capturing through two lens), the higher the first lower bound. Those values are able to be adjusted by a user. The values of the original data rate, the first lower bound, and the predetermined amount are given for illustrative purposes only. Therefore, various values of the original data rate, the first lower bound, and the predetermined amount are within the contemplated scope of the present disclosure. For example, when the resolution of the video is 1920*1080, the first lower bound is set to about 2.0 MB/s or 2.0 Mb/s.

With continued reference to FIG. 2, in step S206, the processing component 160 further determines whether the frame rate of the video data VF is higher than a second lower bound. If so, step S207 is performed. Otherwise, step S208 is performed.

In step S207, the camera component 120 is enabled to decrease the frame rate of the video data VF by a predetermined amount. After step S207 is performed, the processing component 160 returns to step S203.

In some embodiments, the camera component 120 can reduce a sampling frequency of capturing the video, so as to decrease the frame rate. For example, in some embodiments, the original frame rate of the video data VF is about 30 FPS. The second lower bound is about 28 FPS. When the operating temperature OT is higher than the upper temperature bound and the original data rate of the video data VF is lower than the first lower bound, the camera component 120 further decreases the frame rate by the predetermined amount, e.g., 0.5 FPS. In other words, under this circumstance, the original frame rate of the video data VF is decreased from 30 FPS to 29.5 FPS. As the frame rate of the video data VF is reduced, the camera component 120 is able to capture the video with lower sampling frequency, and the processing component 160 is able to process the video data VF with a slower operating speed. Accordingly, the operating temperature OT can be decreased. As a result, the operations of the camera component 120 will not be interrupted, and the recording time of the video is thus extended.

Similarly, the original frame rate and the second lower bound correspond to the image quality of the video. The higher image quality and/or the more complex mode for capturing the video, the higher the second lower bound. Those values are able to be adjusted by the user. The values of the original frame rate, the second lower bound, and the predetermined amount are given for illustrative purposes only. Therefore, various values of those values are within the contemplated scope of the present disclosure.

With continued reference to FIG. 2, in step S208, the processing component 160 outputs a message for reminding the user that the camera component 120 is going to stop capturing the video within a predetermined time, and counts down from the predetermined time. In step S209, the processing component 160 terminates the camera component 120 from capturing the video when the predetermined time is reached.

In some embodiments, the message is implemented with texts. In some other embodiments, the message is implemented by using sound signals. In yet some embodiments, the message is implemented by using the flashlight of light-emitting diode (LED) indicators. Those arrangements of the message are given for illustrative purposes only. Various types of the message are within the contemplated scope of the present disclosure.

For example, in some embodiments, the predetermined time is set to about 1 minute. When the operating temperature OT of the recording device 100 is higher than the upper temperature, the data rate of the video data VF is lower than the first lower bound, and the frame rate of the video data VF is lower than the second lower bound, the processing component 160 have to terminate the progress of the recordation of the camera component 120. In other words, in order to prevent the recording device 100 from the thermal damage, under this circumstance, the processing component 160 only allows the camera component 120 to keep capturing the video for only 1 minute. When 1 minute is over, the camera component 120 is forced to be terminated by the processing component 160. Thus, the recordation is stopped, and the operations of processing the video data VF are end. Accordingly, the operating frequency of the recording device 100 is getting slow. As a result, the operating temperature OT of the recording device 100 is gradually reduced, and the reliability of the recording device 100 can be maintained.

With continued reference to FIG. 2, in step S210, the processing component 160 determines whether the operating temperature OT is lower than a lower temperature threshold. If so, step S211 is performed. Otherwise, step S203 is performed again.

In some embodiments, the lower temperature threshold is lower than the upper temperature threshold. In some embodiments, the lower temperature threshold is about 35° C. The temperature of the lower temperature threshold is given for illustrative purposes only. Various temperatures of the lower temperature threshold are within the contemplated scope of the present disclosure.

In step S211, the camera component 120 is enabled to recover the at least one of the data rate and the frame rate of the video data VF.

For example, whenever the data rate of the video data VF or the frame rate of the video data VF is decreased, the processing component 160 checks whether the current operating temperature OT is less than the lower temperature threshold. If so, the processing component 160 enables the camera component 120 to recover the data rate or the frame rate by the predetermined amount (e.g., 0.5 MB/s or 0.5 Mb/s for the data rate, and 0.5 FPS for the frame rate). In other words, by performing step S211, the decreased date rage and the decreased frame rate can be recovered to their original values. Through such arrangement, in a range of the operating temperature OT able to be withstood by the recording device 100, the quality of the video can be kept as much as possible.

The above illustrations include exemplary operations, but the operations are not necessarily performed in the order shown. Operations may be added, replaced, changed order, and/or eliminated as appropriate, in accordance with the spirit and scope of various embodiments of the present disclosure. For example, in some embodiments, during recording the video, the camera component 120 can be enabled to adjust the frame rate of the video data VF (i.e., operation of step S207), and then adjust the data rate of the video data VF (i.e. operation of step S205).

In various embodiments, the recording control method 200 can be implemented as a computer program carried on a non-transitory computer-readable medium o be read for controlling the camera component of an electronic device. The computer program can be stored in a non-transitory computer readable medium such as a ROM (read-only memory), a flash memory, a floppy disc, a hard disc, an optical disc, a flash disc, a tape, an database accessible from a network. etc.

Figure 3:
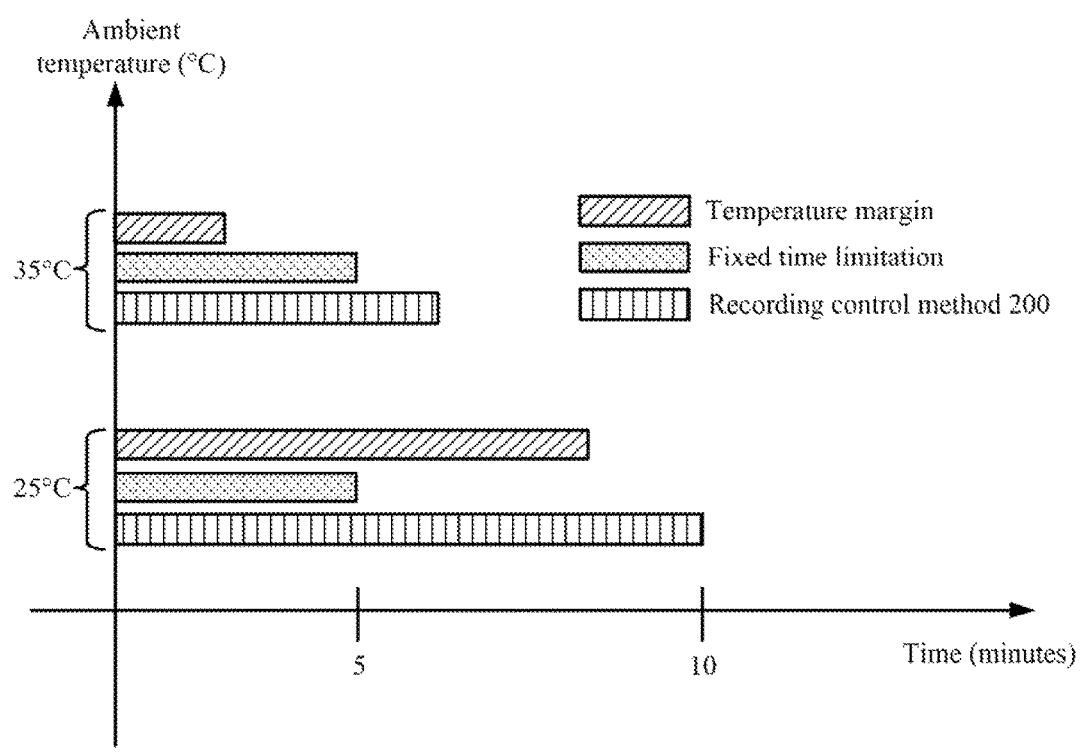
FIG. 3 illustrates a comparison result between the recording time under the recording control method in FIG. 2 and related approaches according to some embodiments of the present disclosure.

Reference is now made to FIG. 3. FIG. 3 illustrates a comparison result between the recording time under the recording control method in FIG. 2 and related approaches according to some embodiments of the present disclosure, As shown in FIG. 3, when the ambient temperature is about 35° C., the recording time of the approach using the fixed time limitation and the recording time of the approach using the temperature margin cannot exceed 5 minutes. Instead, in some embodiments, by using the recording control method 200, the recording time of the video can be extended to about 6-7 minutes, Similarly, when the ambient temperature is about 25° C., the recording time of the approach using the fixed time limitation is about 5 minutes, and the recording time of the approach using the temperature margin is about 7-8 minutes is about 5 minutes. Instead, in some embodiments, by using the recording control method 200, the recording time of the video can be extended to about 10 minutes. In other word, the recording time of the video can be extended by employing the recording control method 200.

In summary, in the range of the operating temperature that can be withstood the recording device, the recording device and the recording control method of the present disclosure can extend the recording time as long as possible without affecting the performance.

It will be apparent to those skilled in the art that various modifications and variations can be made to the structure of the present disclosure without departing from the scope or spirit of the disclosure. In view of the foregoing, it is intended that the present disclosure cover modifications and variations of this closure provided they fall within the scope of the following claims.

What is claimed is:

1. A recording device, comprising:
a camera configured to capture a video to generate video data;
a temperature sensor configured to detect an operating temperature of the recording device; and
a processor configured to process the video data, and to control the camera to capture the video,
wherein when the processor controls the camera to use at least one of the data rate and the frame rate to capture the video, the processor is further configured to start to record a recording time, wherein the recording time identifies the length of time that video has been recorded,
wherein after the processor starts to record the recording time, the processor is further configured to determine whether the recording time of the video exceeds a first time period, wherein the first time period identifies a fixed time length of the video captured by the camera,
wherein when the processor determines that the recording time does not exceed the first time period, the processor controls the camera to still use the at least one of the data rate and the frame rate to capture the video, and wherein when the processor determines that the recording time exceeds the first time period, the processor is configured to enable the camera to adjust the at least one of the data rate and the frame rate according to the operating temperature,
wherein the processor is further configured to determine whether the operating temperature sensed by the temperature sensor is higher than an upper temperature threshold for every second time period after the recording time exceeds the first time period, wherein the first time period is larger than the second time period;
wherein, in response to determining that the operating temperature is higher than the upper temperature threshold, the processor is further configured to perform one of enable the camera to decrease the data rate of the video data, enable the camera to decrease the frame rate of the video data, and terminate the camera from capturing the video.

2. The recording device of claim 1, wherein the processor is further configured to:
in response to determining that the operating temperature is higher than the upper temperature threshold, determine whether the data rate is higher than a first lower bound: and
in response to determining that the data rate is higher than the first lower bound, enable the camera to decrease the data rate of the video data by a first predetermined amount.

3. The recording device of claim 2, wherein the processor is further configured to determine whether the operating temperature sensed by the temperature sensor is lower than a lower temperature threshold when the operating temperature is lower than the upper temperature threshold, and the camera is enabled to recover the at least one of the data rate of the video data and the frame rate of the video data when the operating temperature is lower than the lower temperature threshold.

4. The recording device of claim 3, wherein the processor is further configured to determine whether the operating temperature sensed by the temperature sensor is higher than the upper temperature threshold after the data rate of the video data is decreased or when the operating temperature is higher than the lower temperature threshold.

5. The recording device of claim 2, wherein the processor is further configured to:
in response to determining that the data rate is lower than the first lower bound, determine whether the frame rate of the video data is higher than a second lower bound; and
in response to determining that the frame rate of the video data is higher than the second lower bound, enable the camera to decrease the frame rate of the video data by a second predetermined amount.

6. The recording device of claim 5, wherein the processor is further configured to:
in response to determining that the recording time exceeds the first time period, the operating temperature is higher than the upper temperature threshold, the data rate is lower than the first lower bound, and the frame rate of the video data is lower than the second lower bound, count down from a predetermined count-down time;
output a message for reminding a user that the camera is going to stop capturing the video within the predetermined count-down time; and
terminate the camera from capturing the video when the predetermined count-down time is reached.

7. The recording device of claim 5, wherein the processor is further configured to determine whether the operating temperature sensed by the temperature sensor is higher than the upper temperature threshold after the frame rate of the video data is decreased.

8. A recording control method for an electronic device, the method comprising:
capturing a video using at least one of a data rate and a frame rate, by a camera of the electronic device, to generate a video data;
detecting an operating temperature of the electronic device by a temperature sensor of the electronic device; and
enabling the camera to dynamically adjust the at least one of the data rate and the frame rate, by a processor of the electronic device, according to the operating temperature during the camera captures the video, further comprising:
starting to record a recording time, by the processor, when the camera to use the at least one of the data rate and the frame rate to capture the video, wherein the recording time identifies a length of time that video has been recorded; and
determining whether the recording time of the video exceeds a first time period by the processor after the processor starts to record the recording time, wherein the first time period identifies a basic time length of the video captured by the camera, and
wherein when the processor determines that the recording time does not exceed the first time period, the processor controls the camera to still use the at least one of the data rate and the frame rate to capture the video, and wherein when the processor determines that the recording time exceeds the first time period, the processor enables the camera to adjust the at least one of the data rate and the frame rate according to the operating temperature, wherein the processor is further configured to determine whether the operating temperature sensed by the temperature sensor is higher than an upper temperature threshold for every second time period after the recording time exceeds the first time period, wherein the first time period is larger than the second time period:

wherein, in response to determining that the operating temperature is higher than the upper temperature threshold, the processor is further configured to perform one of enable the camera to decrease the data rate of the video data, enable the camera to decrease the frame rate of the video data, and terminate the camera from capturing the video.

9. The recording control method of claim 8, wherein the step of enabling the camera comprises:

in response to determining that the operating temperature is higher than the upper temperature threshold, determining whether the data rate is higher than a first lower bound, by the processor; and in response to determining that the data rate is higher than the first lower bound, enable the camera to decrease the data rate of the video data by a first predetermined amount by the camera.

10. The recording control method of claim 9, further comprising:

determining whether the operating temperature sensed by the temperature sensor is lower than a lower temperature threshold, by the processor, when the operating temperature is lower than the upper temperature threshold; and recovering the at least one of the data rate of the video data and the frame rate of the video data, by the camera, when the operating temperature is lower than the lower temperature threshold.

11. The recording control method of claim 10, further comprising:

determining whether the operating temperature sensed by the temperature sensor is higher than the upper temperature threshold, by the processor, after the data rate of the video data is decreased or when the operating temperature is higher than the lower temperature threshold.

12. The recording control method of claim 9, further comprising:

in response to determining that the data rate is lower than the first lower bound, determining whether the frame rate of the video data is higher than a second lower bound, by the processor; and in response to determining that the frame rate of the video data is higher than the second lower bound, enable the camera to decrease the frame rate of the video data by a second predetermined amount.

13. The recording control method of claim 12, further comprising:

in response to determining that the recording time exceeds the first time period, the operating temperature is higher than the upper temperature threshold, the data rate is lower than the first lower bound, and the frame rate of the video data is lower than the second lower bound, counting down from a predetermined count-down time by the processor;

outputting a message by the processor, for reminding a user that the camera is going to stop capturing the video within the predetermined count-downtime; and terminating the camera from capturing the video, by the processor, when the predetermined count-down time is reached.

14. The recording control method of claim 12, further comprising:

determining whether the operating temperature sensed by the temperature sensor is higher than the upper temperature threshold, by the processor, after the frame rate of the video data is decreased.

15. A non-transitory computer readable medium having a computer program which, when executed by a processor of an electronic device, result in the processor performing operations comprising:

enabling a camera to capture a video using at least one of a data rate and a frame rate, so as to generate a video data;

enabling a temperature sensor to detect an operating temperature of the electronic device; and enabling the camera to dynamically adjust the at least one of the data rate and the frame rate of the video data according to the operating temperature during the camera captures the video, further comprising:

enabling the processor to start to record a recording time when the camera is enabled to use the at least one of the data rate and the frame rate to capture the video, wherein the recording time identifies a length of time that video has been recorded; and enabling the processor to determine whether the recording time of the video exceeds a first time period after the processor is enabled to start to record the recording time, wherein the first time period identifies a basic time length of the video captured by the camera, and wherein when the processor determines that the recording time does not exceed the first time period, the processor controls the camera to still use the at least one of the data rate and the frame rate to capture the video, and wherein when the processor determines that the recording time exceeds the first time period, the processor enables the camera to adjust the at least one of the data rate and the frame rate according to the operating temperature, wherein the processor is further configured to determine whether the operating temperature sensed by the temperature sensor is higher than an upper temperature threshold for every second time period after the recording time exceeds the first time period, wherein the first time period is larger than the second time period:

wherein, in response to determining that the operating temperature is higher than the upper temperature threshold, the processor is further configured to perform one of enable the camera to decrease the data rate of the video data, enable the camera to decrease the frame rate of the video data and terminate the camera from capturing the video.

16. The non-transitory computer readable medium of claim 15, wherein the operation of enabling the camera comprising:

In response to determining that the operating temperature is higher than an upper temperature threshold and the data rate is higher than a first lower bound, decreasing the data rate of the video data by a first predetermined amount; and In response to determining that the operating temperature is higher than the upper temperature threshold, the data rate is lower than the first lower bound, and the frame rate of the video data is higher than a second lower bound, decreasing the frame rate of the video data by a second predetermined amount.

\* \* \* \* \*